United States Patent Office 3,572,085
Patented Mar. 23, 1971

3,572,085
METHOD OF DETECTING LEAKS IN
FLUID-CONTAINING EQUIPMENT
Joseph J. Packo, 3043 N. Federal Highway,
Fort Lauderdale, Fla. 33306
No Drawing. Filed Dec. 18, 1968, Ser. No. 784,898
Int. Cl. G01m 3/22
U.S. Cl. 73—40.5          8 Claims

ABSTRACT OF THE DISCLOSURE

The invention relates to a method of detecting leaks in closed systems, for example pipelines, vessels, containers and other equipment adapted to contain fluids in static or flowing condition. According to the present invention certain agents which provide heat reactions, referred to as heat indicants, are used. A suitable amount of a heat-indicant compound is supplied to the interior of such equipment. In event a leak exists or develops in such equipment the heat-indicant upon escape into the atmosphere will react with oxygen and/or moisture and generate heat. The heat thus generated can be detected by suitable sensitive infrared detector equipment thereby giving an indication that a leak exists.

Examples of heat-indicant agents which are suitable for detecting leaks in closed systems are metal alkyls, metal alkyl halides, metal hydrides, metal alkyl hydrides, diphosphines, alkyl phospines halide, alkyl phosphines. When such agents escape into the air they react with the oxygen and/or moisture and generate heat which can be detected by suitable infrared detector equipment.

SUMMARY OF THE INVENTION

This invention provides a method for detecting leaks in equipment adapted to store or convey fluids. Such equipment may include pipelines, vessels, tanks, containers, aircraft and ship fluid systems, missile fluid systems, telephone and electrical conduit, etc. which are hereinafter referred to generally as fluid-containing equipment. Such equipment is adapted to contain liquids or gases such as fuels in gas or liquid form, hypergolic fluids, hydrogen, nitrogen, helium, etc. A selected non-reactive heat-indicant is introduced into such equipment in suitable amounts. In event a leak develops or exists in such equipment the fluid in such equipment containing the heat-indicant will escape into the atmosphere. The heat-indicant agent will react exothermically with the oxygen and/or moisture present in the ambient atmosphere and generate heat which can be readily detected by means of available infrared detector equipment.

Infrared heat detectors are available to detect or sense extremely small quantities of infrared radiation. Such detectors are devices which detect electromagnetic radiation having a wavelength greater than detectable by the human eye. Infrared detectors may be classified by the basic mechanism of operation. One class, called thermal detectors, uses the power of the radiation to increase the temperature of the detecting element. This, in turn, causes some property of the detector, often the electrical resistance, to change. In the second class, called photodetectors, the radiation produces a direct effect on some electrical property of the detector. The thermal class comprises the radiation thermocouple, the bolometer, and the Golay cell. The radiation thermocouple has a number of thermocouples connected in series, arranged so that the radiation falls on half of the junctions, thus causing a voltage to be generated. The bolometer functions through a resistance change in a material having a high temperature coefficient of resistance. The Golay cell utilizes the heat of the radiation to deflect a diaphragm in accordance with the amount of radiation.

The photodetectors can be classified by type of most efficient use as photoconductive and photovoltaic. These in turn can be classified into the compound types, such as lead sulfide, lead selenide, lead telluride, and thallium sulfied, and the elemental types, such as germanium and silicon. However, some typs, such as germanium or silicon photodiodes and phototransistors, can be used as either photoconductive or photovoltaic detectors.

An example of available infrared detector equipment is Infrared Camera Model T–101 sold by Barnes Engineering Co., Stamford, Conn. The camera responds to the infrared radiation emitted by all objects. In operation, an optical system scans the field of view of the camera's highly sensily sensitive infrared detector across the target. The collected radiation is converted into a proportional electrical signal. This signal is amplified, processed, and displayed on a cathode ray tube in the form of a thermal image. These thermal images show the temperature distribution over the surface of the target in shades of grey—warmer areas are light, cooler regions dark.

The amount of the heat-indicant agents which is introduced in the equipment may vary greatly. In general very small amounts of the agent are used because they spontaneously react with oxygen and/or moisture in the air to produce infrared heat which can be readily detected by available detectors.

EMBODIMENTS OF THE INVENTION

According to this invention, particularly suitable heat-indicant agents are selected normally gaseous or volatile metal hydrides, metal alkyls, metal alkyl halides, and metal alkyl hydrides. These agents may be added for example to a non-reactive vehicle gas contained in the equipment, such as hydrogen, helium or nitrogen. These added heat-indicants are preferably substances which are easily volatilized and which can be admixed with the vehicle gas in the epuipment and carried along with the gas in the equipment. If a leak develops the added agent upon escape from the equipment reacts with the oxygen and/or moisture in the ambient atmosphere to produce heat.

Heat-indicant agents suitable for admixing with vehicle gases may be selected silicon hydrides and boron hydrides. The agents may also be compounds having the general formula:

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1.

Specific illustrative heat-indicant agents are triethyl aluminum, ethyl aluminum sesquichloride, diethyl aluminum chloride, ethyl aluminum dichloride, diisobutyl aluminum chloride, monoisobutyl aluminum dichloride, triisobutyl aluminum, aluminum diethyl hydride, methyl aluminum sesquichloride, diisobutyl aluminum hydride, triisohexyl aluminum, tri-n-hexyl aluminum, tri-n-octyl aluminum, tri-n-butyl aluminum, tri-n-decyl aluminum, tri-n-propyl aluminum, triisopropyl aluminum, tri-n-butyl aluminum, and tricyclohexyl aluminum. Boron compounds analogous to the aforementioned aluminum compounds may be used such as boron triethyl, boron diethyl bromide, etc.

Other suitable heat-indicant agents are compounds having the formula:

$$ZR_nX_{2-n}$$

wherein Z is zinc or cadmium; R is an aliphatic straight chain, branched chain or cyclic organic group having 1 to 10 carbon atoms; X is hydrogen or a halogen from the group of chlorine, bromine, iodine and fluorine; and $n$ is an integer of at least 1.

Illustrative specific heat-indicant compounds are dimethyl zinc, diethyl zinc, di-n-butyl zinc, diethyl cadmium, diisobutyl cadmium, dioctyl zinc, and dicyclohexyl zinc.

These agents are supplied to the fluid-containing equipment in concentrations ranging from about 0.001 to about 10% by weight of the fluid in the system. They may also be conveniently added in solutions of suitable hydrocarbons, such as butane, hexane, heptane, etc. which will uniformly volatilize or disperse in the gas contained in the closed fluid-containing apparatus.

A mixture of 85% triethyl borane and 15% diethyl zinc has also been found suitable for admixture with helium, hydrogen or nitrogen gas in amounts 0.05 to 25%. A hydrocarbon solution containing 25% by weight triethyl aluminum containing a trace of diethyl zinc may also be added to a vehicle gas and volatilized therein for detecting leaks.

When the fluid containing the heat-indicant agent escapes into the atmosphere these metal-organo agents may react with the ambient moisture and hydrolyze or react exothermally with the oxygen in the atmosphere to develop heat which can be observed by infra-red detectors.

The present invention is also useful in pre-testing equipment for existing leaks. In such case, it is necessary to use a non-reactive or inert vehicle gas for the heat-indicant agent. In such cases the air or other fluid present in the vessel is first completely purged or flushed out with an inert gas, such as nitrogen, hydrogen, helium or carbon dioxide and a selected non-reactive heat-indicant agent or mixture of agents is then added in predetermined amount through a suitably connected inlet. The heat-indicant agent is admixed with the gas in the interior of the vessel so that the agent is uniformly distributed therein and the vessel is then closed or sealed. A predetermined superatmospheric pressure is then maintained in the interior of the vessel and the escape into the atmosphere of the heat-indicant agent at the locus where a leak may exist can be readily detected by suitable infrared detector equipment. When the equipment is used to store or convey fluids which are non-reactive with the heat-indicant agent it is obviously not necessary to flush the system with an inert gas and the agent can be added in suitable amounts directly into the system.

Other suitable heat-producing agents are alkoxide boranes having the general formula:

$$R_nB(OR')_{3-n}$$

wherein R is an aliphatic straight chain, branched chain or cyclic organic group having 1 to 10 carbon atoms, R' is an alkyl group having 1 to 3 carbon atoms, and $n$ is an integer of 0 to 3. Examples of these agents are $B(OCH_3)_3$ (trimethoxy borane) and $CH_3B(OC_2H_5)_2$ (methyldiethoxy borane). These agents react and hydrolize with moisture and generate heat.

The invention is not restricted to the use of the specific agents previously mentioned. Obviously other heat-producing agents can be used in practicing this invention. Other useful agents are diphosphine; monoalkylphosphines having the structure $RPH_2$ wherein R is an alkyl group having 1 to 4 carbon atoms, for example monomethylphosphine, monoethylphosphine, etc.; dimethylphosphine; methylethylphosphine; monotrifluoromethylphosphine $(CF_3)PH_2$ and ditrifluoromethylphosphine $(CF_3)_2PH$.

Other suitable agents are silanes having 1 to 6 Si atoms; oxysilane derivatives, e.g. disiloxane; nitrogen silane derivatives, e.g. trisilylamine; silane substituted phosphines, e.g. trisilylphosphine.

When using phosphine as the heat-indicant it is desirable to use the technical grade phosphine rather than pure phosphine which is not pyrophoric because the technical grade usually contains diphosphine and other impurities which serve to trigger the oxidation of the phosphine upon contact with oxygen in the atmosphere. Other pyrophoric triggering agents may be added in small amounts to pure phosphine such as metal alkyls, metal alkyl halides, metal hydrides and metal alkyl hydrides. Specific illustrative examples of such pyrophoric triggering agents are triethyl aluminum, triethylborane, diethyl zinc, ethyl aluminum sesquichloride, silicon and boron hydrides and aluminum diethyl hydride.

The previously described heat-indicant agents may be admixed with fuel gases which may be in gaseous or liquid state, or they may be admixed with non-oxidizing vehicle gases for pretesting leaks in vessels and the like, in amounts from about 0.1 gm. to about 2 gm. per 100 cu. ft. of gas, or from about 50 to about 2000 p.p.m. by weight of gas. The heat-indicant agents are used in sufficient amount so that upon escape into the atmosphere they will react with the oxygen and/or moisture present in the atmosphere and generate heat. In case the equipment should contain small amounts of moisture or oxygen, the selected agent may react with the oxygen present and thus serve as an oxygen or moisture scavenger. Also where the equipment such as pipelines are buried in soil which may contain significant amounts of occluded air and moisture sufficient indicant is used in the pipelines so that upon leakage through the soil detectable heat is generated in the adjacent soil. When a substantial leakage occurs the escaping gas tends to produce fissures in the soil which tend to dry and harden due to the evaporative effect of the escaping gas, so that the gas containing the heat-indicant will escape into the atmosphere and produce heat as explained previously.

The invention is particularly useful for detecting leaks in natural fuel gas pipeline systems at various points in route to the final consumer. Also according to the present invention, pipes, vessels, closed systems and the like which are intended to contain fluids therein can be pre-tested under static or dynamic pressures for leaks which may exist in such items either in the walls thereof or at the joints or connections of process systems in pipelines. A selected heat-indicant agent carried in a gas vehicle is pumped into the closed or sealed vessel or system to be pre-tested for leaks. A predetermined pressure is maintained for a suitable time in the interior thereof, and if any leaks are present the admixed gas and heat-indicant upon escape into the atmosphere will generate heat which can be observed by a suitable detector.

In certain cases leaks may develop in the fluid-containing equipment which will permit moisture to enter the equipment. In such event certain of the heat-indicant agents will react to generate heat which can be detected by suitable equipment at the locus of the leak.

I may also introduce into equipment containing fluids heat-indicants which upon escape into the atmosphere will volatilize and absorb heat endothermically from the surroundings producing a local differential heat condition which is observable by means of infrared equipment. Such liquid endothermic heat-indicants may be introduced into the equipment containing a liquid in suitable amounts to produce heat differential changes at the locus of a leak. Illustrative agents are diethylether, methyl chloride, and any of the available Freons, such as dichlorodifluoromethane and other like polyfluorides.

In instances where the equipment contains hypergolic fluids which ignite upon escape into the atmosphere the present invention makes it possible to instantly detect leaks in such equipment by use of monitoring infrared detectors even before the hypergolic fluid escapes in sufficient amount to ignite.

This invention makes is possible to locate leakage points in a system or vessel that normally cannot be determined until the system is operating, carrying or containing fluids for which it was designed. This invention is effective for pre-testing and detecting any existing leak points, such as for pre-testing the piping of aircraft systems, ship systems, missile systems; gas filled telephone and cable conduits; gas or liquid systems, such as transmission, distribution lines; pre-testing submarine systems containing gas or liquid; pre-testing of cryogenic containers and transmission lines and the like. This invention has a broad spectrum of utility in pre-testing for leakage in missile equipment, aircraft systems, leakage pre-testing of gas and liquid lines, chemical lines and containers, as well as detecting leaks when such equipment is being used for its intended use.

I claim:
1. The method of locating leaks in closed equipment which comprises the steps of purging the interior of said equipment with an inert gas, admixing an exothermic volatilized heat-indicant agent with said gas until said agent is uniformly distributed therein selected from the group consisting of silicon hydrides and boron hydrides; a compound having the formula:

$$MR_nX_{3-n}$$

wherein M is aluminum or boron; R is an aliphatic or olefinic straight chain, branched chain or cyclic organic group having 1 to 10 carbon atoms, X is hydrogen or a halogen selected from the group of chlorine, bromine, iodine and fluorine, and $n$ is an integer of at least 1; a compound having the formula:

$$ZR_nX_{2-n}$$

wherein Z is zinc or cadmium, R is an aliphatic straight chain, branched chain or cyclic organic grouping having 1 to 10 carbon atoms, X is hydrogen or a halogen from the group of chlorine, bromine, iodine and fluorine, and $n$ is an integer of at least 1; and an alkoxide borane having the formula:

$$R_nB(OR')_{3-n}$$

wherein R is an aliphatic straight chain, branched chain or cyclic organic group having 1 to 10 carbon atoms, R' is an alkyl group having 1 to 3 carbon atoms, and $n$ is an integer 0 to 3; sealing said equipment containing said agent, and maintaining a predetermined superatmospheric pressure in the interior of said equipment and observing the heat generated exothermally upon the escape into the atmosphere of said agent at the locus of said equipment where a leak is present.

2. The method of claim 1 wherein the heat-indicant agent is an aluminum alkyl.
3. The method of claim 1 wherein the heat-indicant agent is a zinc alkyl.
4. The method of claim 1 wherein the agent is diethyl zinc.
5. The method of claim 1 wherein the heat-indicant agent is triethyl aluminum.
6. The method of claim 1 wherein the heat-indicant agent is a mixture of triethyl aluminum and diethyl zinc.
7. The method of claim 1 wherein the heat-indicant agent is trimethoxy borane.
8. The method of claim 1 wherein the heat-indicant agent is triethyl borane.

References Cited

UNITED STATES PATENTS

| | | | |
|---|---|---|---|
| 3,126,734 | 3/1964 | Stutzman | 73—40.7X |
| 3,085,423 | 4/1963 | Champion | 73—40.5 |
| 3,483,736 | 12/1969 | Anderson | 73—40.7 |

FOREIGN PATENTS

| | | | |
|---|---|---|---|
| 712,260 | 7/1954 | Great Britain | 73—40.5 |

LOUIS R. PRINCE, Primary Examiner

W. A. HENRY II, Assistant Examiner

U.S. Cl. X.R.

73—40.7; 252—408